United States Patent
Kuroiwa et al.

(10) Patent No.: US 6,317,180 B1
(45) Date of Patent: *Nov. 13, 2001

(54) LIQUID CRYSTAL DEVICE AND ELECTRONIC APPARATUS USING THE SAME HAVING TWO ABSORPTIVE POLARIZERS, A REFLECTIVE POLARIZER, AND A BACKLIGHT

(75) Inventors: Masahiro Kuroiwa, Nagano; Naonori Miwa, Matsumoto; Atsunari Tsuda, Suwa, all of (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,457

(22) Filed: Apr. 28, 1999

(30) Foreign Application Priority Data

Apr. 30, 1998 (JP) .................................. 10-137430

(51) Int. Cl.$^7$ .................................. G02F 1/1335
(52) U.S. Cl. .................................. 349/96; 349/98
(58) Field of Search .................. 349/71, 70, 96, 349/106, 104, 98

(56) References Cited

U.S. PATENT DOCUMENTS 4,630,894 * 12/1986 Cremers ................. 350/338
4,882,617 * 11/1989 Vriens ..................... 358/60

FOREIGN PATENT DOCUMENTS 0 825 477 A2    2/1998 (EP) .
97/01788  *  1/1997 (WO) .

* cited by examiner

*Primary Examiner*—Walter J. Malinowski

(57) ABSTRACT

The liquid crystal device of the present invention effectively prevents reversion of bright/dark states between a reflective display mode and a transmissive display mode. The liquid crystal device includes a first absorptive polarizer, which receives light from outside; a liquid crystal cell, which receives light emitted from the first absorptive polarizer; a second absorptive polarizer, which receives light emitted from the liquid crystal cell; and a reflective polarizer, which receives light emitted from the second absorptive polarizer. The reflective polarizer has an axis of reflection in a predetermined direction to reflect at least part of light that has been transmitted through the first absorptive polarizer, the liquid crystal cell, and the second absorptive polarizer to be incident on the reflective polarizer. The reflective polarizer partially transmits light including a linearly polarized light component which is included in light entering the reflective polarizer from an opposite side to the second absorptive polarizer and which is to be transmitted through the second absorptive polarizer. The first absorptive polarizer has an axis of transmission in a specific direction to cause light, which has been reflected by the reflective polarizer and transmitted through the second absorptive polarizer, to be transmitted through the first absorptive polarizer.

4 Claims, 12 Drawing Sheets

LIQUID CRYSTAL DEVICE AND ELECTRONIC APPARATUS USING THE SAME HAVING TWO ABSORPTIVE POLARIZERS, A REFLECTIVE POLARIZER, AND A BACKLIGHT

BACKGROUND OF THE INVENTION

1. Field of the Invention

The present invention relates to a transflective liquid crystal device (hereinafter also referred to as a transflective liquid crystal device) capable of both reflective display, which reflects incident light to display an image, and transmissive display, which transmits incident light to display an image.

2. Description of the Related Art

The transflective liquid crystal device is widely used as a display device of portable information equipment. FIG. 11 schematically illustrates the structure of a conventional transflective liquid crystal device 1000. The transflective liquid crystal device 1000 includes an absorptive polarizer 1020, a liquid crystal cell 1030, a light diffusing plate 1040, a reflective polarizer 1050, and a light absorbing plate 1060. A backlight 1070 is further disposed outside the light absorbing plate 1060. The liquid crystal cell 1030 includes a lower glass substrate 1033, an upper glass substrate 1031, and a liquid crystal layer 1035 sealed between these glass substrates 1031 and 1033. A plurality of transparent signal electrodes 1034 are mounted on the upper surface of the lower glass substrate 1033. A plurality of transparent scanning electrodes 1032 are mounted to be perpendicular to the plurality of signal electrodes 1034 on the lower surface of the upper glass substrate 1031. The liquid crystal cell 1030 has a passive matrix configuration, in which one pixel is defined by one signal electrode 1034, one scanning electrode 1032, and the liquid crystal layer 1035 between these electrodes 1034 and 1032. Namely the light transmitted through the liquid crystal layer 1035 is modulated according to the voltage applied between one signal electrode 1034 and one scanning electrode 1032. The liquid crystal layer 1035 may be made of a TN (twisted nematic) liquid crystal composition or STN (super twisted nematic) liquid crystal composition. A translucent film having the transmittance of about 50% is used for the light absorbing plate 1060.

FIG. 12 shows problems arising in the conventional transflective liquid crystal device 1000. The absorptive polarizer 1020 has an axis of transmission 1020T that is set parallel to the plane of the drawing, and an axis of absorption 1020A that is perpendicular to the plane of the drawing. The reflective polarizer 1050 has, on the other hand, an axis of transmission 1050T that is parallel to the plane of the drawing, and an axis of reflection 1050R that is perpendicular to the plane of the drawing. The following describes the operations of the liquid crystal display 1000 on the assumption that the polarizing direction of the light transmitted through the liquid crystal cell 1030 is rotated by 90 degrees while no voltage is applied between the signal electrodes 1034 and the scanning electrodes 1032 (that is, when the liquid crystal cell 1030 is in an OFF state).

This liquid crystal device 1000 has two display modes, that is, a reflective display mode using incident light 1100 from the outside and a transmissive display mode using light 1120 emitted from the backlight 1070. In the reflective display mode, when the non-polarized light 1100 enters the absorptive polarizer 1020, a linearly polarized light component having the polarization direction parallel to the axis of absorption 1020A is mostly absorbed by the absorptive polarizer 1020, while only a linearly polarized light component having the polarization direction parallel to the axis of transmission 1020T is transmitted through the absorptive polarizer 1020 and enters the liquid crystal cell 1030. The optical rotatory power of the liquid crystal cell 1030 causes the light component entering the liquid crystal cell 1030 to be converted into linearly polarized light having a polarizing direction that is perpendicular to that of the incident light. The polarizing direction of the light emitted from the liquid crystal cell 1030 is substantially identical with the direction of the axis of reflection 1050R of the reflective polarizer 1050, so that most of the light emitted from the liquid crystal cell 1030 is reflected by the reflective polarizer 1050 and re-enters the liquid crystal cell 1030 as return light. The liquid crystal cell 1030 converts the return light into linearly polarized light having a polarizing direction that is perpendicular to that of the return light. At this moment, the polarizing direction of the return light emitted from the liquid crystal cell 1030 is substantially identical with the direction of the axis of transmission 1020T of the absorptive polarizer 1020, so that most of the return light emitted from the liquid crystal cell 1030 is transmitted through the absorptive polarizer 1020. In the reflective display mode, the pixels where the liquid crystal cell 1030 is in the OFF state receive the light reflected and returned as discussed above and are thereby observed as bright pixels. The pixels where the liquid crystal cell 1030 is in an ON state are, on the contrary, observed as dark pixels.

In the transmissive display mode, on the other hand, when the non-polarized light 1120 enters the reflective polarizer 1050, a linearly polarized light component having the polarization direction parallel to the axis of reflection 1050R is mostly reflected by the reflective polarizer 1050, while only a linearly polarized light component having the polarization direction parallel to the axis of transmission 1050T is transmitted through the reflective polarizer 1050 and enters the liquid crystal cell 1030. The optical rotatory power of the liquid crystal cell 1030 causes polarizing direction of the light transmitted through the liquid crystal cell 1030 to be converted into a direction substantially parallel to the axis of absorption 1020A of the absorptive polarizer 1020. Most of the light emitted from the liquid crystal cell 1030 is accordingly absorbed by the absorptive polarizer 1020 and is not transmitted through the absorptive polarizer 1020. In the transmissive display mode, since the light is absorbed in the course of the optical path, the pixels where the liquid crystal cell 1030 is in the OFF state are observed as dark pixels. The pixels where the liquid crystal cell 1030 is in the ON state are, on the contrary observed as bright pixels. The relationship between the ON/OFF state of the liquid crystal cell 1030 and the bright/dark state of the pixel in the transmissive display mode is reverse to that in the reflective display mode. In the transflective liquid crystal device 1000, the brightness and darkness of display are reversed between the reflective display mode and the transmissive display mode.

SUMMARY OF THE INVENTION

The object of the present invention is thus to provide a liquid crystal device that effectively prevents the reversion of the same bright/dark states between the reflective display mode and the transmissive display mode, and also to provide an electronic apparatus using such a liquid crystal device.

At least part of the above and the other related objects is attained by a liquid crystal device that modulates light responsive to given image signals. The liquid crystal device includes a first absorptive polarizer, which receives light from outside;a liquid crystal cell, which receives light emitted from the first absorptive polarizer; a second absorptive polarizer, which receives light emitted from the liquid crystal cell; and a reflective polarizer, which receives light emitted from the second absorptive polarizer. The reflective polarizer has an axis of reflection in a predetermined direction to reflect at least part of light that has been transmitted through the first absorptive polarizer, the liquid crystal cell, and the second absorptive polarizer to be incident on the reflective polarizer. The reflective polarizer partially transmits light including a linearly polarized light component which is included in light entering the reflective polarizer from an opposite side to the second absorptive polarizer and which is to be transmitted through the second absorptive polarizer. The first absorptive polarizer has an axis of transmission in a specific direction to cause light, which has been reflected by the reflective polarizer and transmitted through the second absorptive polarizer, to be transmitted through the first absorptive polarizer.

The liquid crystal device of the present invention works as discussed below in a first state of the liquid crystal cell, in which the light entering the first absorptive polarizer from the outside is transmitted through the first absorptive polarizer, the liquid crystal cell, and the second absorptive polarizer. Part of the light that is emitted from the second absorptive polarizer and includes a linearly polarized light component having a polarizing direction parallel to the axis of reflection of the reflective polarizer is reflected by the reflective polarizer, transmitted through the second absorptive polarizer and the liquid crystal cell, and emitted from the first absorptive polarizer. When the light enters the reflective polarizer on the opposite side to the second absorptive polarizer in the first state of the liquid crystal cell, on the other hand, part of the light is transmitted through the reflective polarizer, the second absorptive polarizer, and the liquid crystal cell in this sequence and emitted from the first absorptive polarizer. In this first state of the liquid crystal cell, the light entering the first absorptive polarizer from the outside is reflected and emitted to the outside. The light entering the reflective polarizer is also eventually emitted to the outside. The liquid crystal cell in the first state is accordingly observed as a bright pixel both in the reflective display mode and in the transmissive display mode.

The liquid crystal device works as discussed below in a second state of the liquid crystal cell, in which the light entering the first absorptive polarizer from the outside is absorbed by the second absorptive polarizer. The light supplied from the outside into the first absorptive polarizer is absorbed by the second absorptive polarizer, so that there is no light reflected by the reflective polarizer. Namely the light entering the first absorptive polarizer from the outside is not emitted from the first absorptive polarizer. When the light enters the reflective polarizer on the opposite side to the second absorptive polarizer in the second state of the liquid crystal cell, on the other hand, part of the light is transmitted through the reflective polarizer, the second absorptive polarizer, and the liquid crystal cell in this order and enters the first absorptive polarizer. This light is, however, absorbed by the first absorptive polarizer and is thereby not emitted. In this second state of the liquid crystal cell, the light entering the first absorptive polarizer from the outside is not emitted to the outside. The light entering the reflective polarizer is nor emitted to the outside. The liquid crystal cell in the second state is accordingly observed as a dark pixel both in the reflective display mode and in the transmissive display mode.

As discussed above, the liquid crystal device of the present invention effectively maintains the same bright/dark states in both of the reflective and transmissive display modes.

In accordance with one preferable application, the liquid crystal device further includes a diffusing plate interposed between the second absorptive polarizer and the reflective polarizer.

This arrangement effectively suppresses specular reflection occurring on the reflective polarizer.

In accordance with another preferable application of the liquid crystal device, the predetermined direction of the reflection axis of the reflective polarizer is adjusted to cause a ratio of an amount of first light to an amount of second light to be not less than about 15% in a state where a linearly polarized light component having a predetermined first polarizing direction is emitted in a greatest amount from the liquid crystal cell towards the second absorptive polarizer. The first light is one that is reflected by the reflective polarizer and transmitted through the second absorptive polarizer, the liquid crystal cell, and the first absorptive polarizer. The second light is one that is incident on the first absorptive polarizer.

Unlike the conventional liquid crystal display, this arrangement enables non-reversed transmissive display without unduly affecting the advantageous characteristics (including brightness) of reflective display.

In accordance with still another preferable application, the liquid crystal device further includes a backlight disposed opposite to the second absorptive polarizer across the reflective polarizer. Light emitted from the backlight is adjusted to have a color other than white, in order to cause color of a first light to be close to color of a second light. The first light is one that is emitted from the backlight and transmitted through the reflective polarizer, the second absorptive polarizer, the liquid crystal cell, and the first absorptive polarizer. The second light is one that comes from the outside and is transmitted through the first absorptive polarizer, the liquid crystal cell, and the second absorptive polarizer, subsequently reflected by the reflective polarizer, then transmitted through the second absorptive polarizer, the liquid crystal cell, and the first absorptive polarizer.

In this structure, it is preferable that the backlight includes a light source and a color filter that adjusts color of light emitted from the light source.

This arrangement enables the color of a transmitted light component that is included in the light emitted from the backlight, transmitted through the reflective polarizer, and emitted from the first absorptive polarizer to be adjusted close to the color of a reflected light component that is supplied from the outside to the first absorptive polarizer, reflected by the reflective polarizer, and emitted from the first absorptive polarizer. This reduces a difference in color tone of the display between the reflective display mode and the transmissive display mode.

Any one of the above liquid crystal devices may be mounted as a display device on a variety of electronic apparatuses.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment

Figure 1:
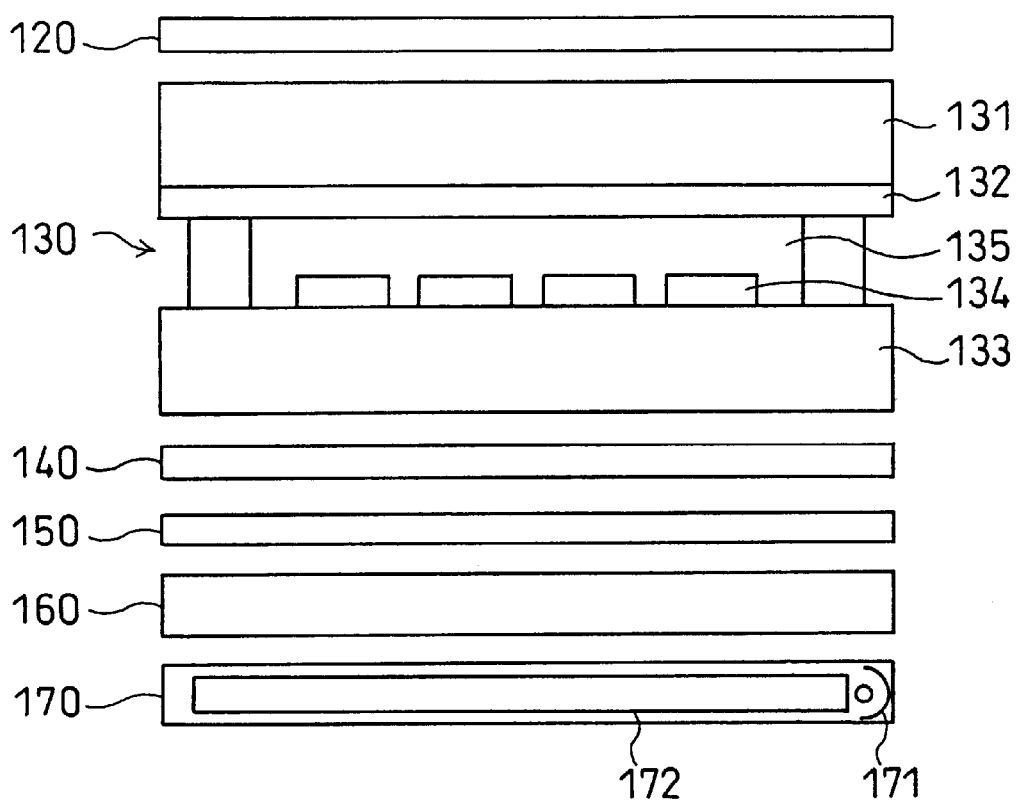
FIG. 1 schematically illustrates the structure of a transflective liquid crystal device 100 in a first embodiment according to the present invention.

FIG. 1 schematically illustrates the structure of a transflective liquid crystal device 100 in a first embodiment according to the present invention. The liquid crystal device 100 includes a first absorptive polarizer 120, a liquid crystal cell 130, a second absorptive polarizer 140, a light scattering plate (diffusing plate) 150, and a reflective polarizer 160. A backlight 170 is further disposed outside the reflective polarizer 160. Although there is shown a gap between each element in FIG. 1, the gap is only for the clarity of illustration. In an actual device, the respective elements are in close contact with one another without any gaps. This is also adopted in other embodiments and modifications discussed later.

The liquid crystal cell 130 includes a lower glass substrate 133, an upper glass substrate 131, and a liquid crystal layer 135 sealed between these glass substrates 131 and 133. A plurality of transparent signal electrodes 134 are mounted on the upper surface of the lower glass substrate 133. A plurality of transparent scanning electrodes 132 that are arranged perpendicularly to the signal electrodes 134 are mounted on the lower surface of the upper glass substrate 131. The liquid crystal layer 135 is composed of a TN (twisted nematic) liquid crystal composition or STN (super twisted nematic) liquid crystal composition. The liquid crystal cell 130 has a simple matrix configuration, in which one pixel is defined by one signal electrode 134, one scanning electrode 132, and the liquid crystal layer 135 between these electrodes 134 and 132. Although there is shown a relatively wide gap between the upper glass substrate 131 and the lower glass substrate 133 in FIG. 1, this is only for the clarity of illustration. In an actual device, the upper glass substrate 131 face the lower glass substrate 133 across a narrow gap of several to ten-odd micrometers. The liquid crystal cell 130 has color filters, an alignment layer, a driving circuit, and other related elements, in addition to the elements illustrated in FIG. 1. For example, color filters are interposed between the lower glass substrate 133 and the signal electrodes 134 to be arranged perpendicularly to the scanning electrodes 132. The color filters of the respective colors, red (R), green (G), and blue (B) are arranged repeatedly in this sequence corresponding to the respective signal electrodes 134, that is, arranged in stripe. The color filters may alternatively be mounted on the upper glass substrate 131. The arrangement of the color filters is not limited to the stripe configuration but may have a mosaic configuration. These elements are not essential for the explanation of the present invention and are thus omitted from the illustration.

The first absorptive polarizer 120 and the second absorptive polarizer 140 respectively have the function of transmitting a predetermined linear polarized light component while absorbing the other linear polarized light components. The polarizers used in the conventional transmission liquid crystal devices and reflection liquid crystal devices can be applied for these absorptive polarizers 120 and 140.

The reflective polarizer 160 has the function of reflecting a predetermined linear polarized light component while transmitting the other linear polarized light components. The reflective polarizer 160 is made of, for example, a birefringent dielectric multi-layered film. The details of the birefringent dielectric multi-layered film are disclosed in International Publication No. WO97/01788 and International Application-based Japanese Patent Laid-Open Gazette No. 9-506985, the disclosures of which are herein incorporated by reference for all purposes.

Figure 2:
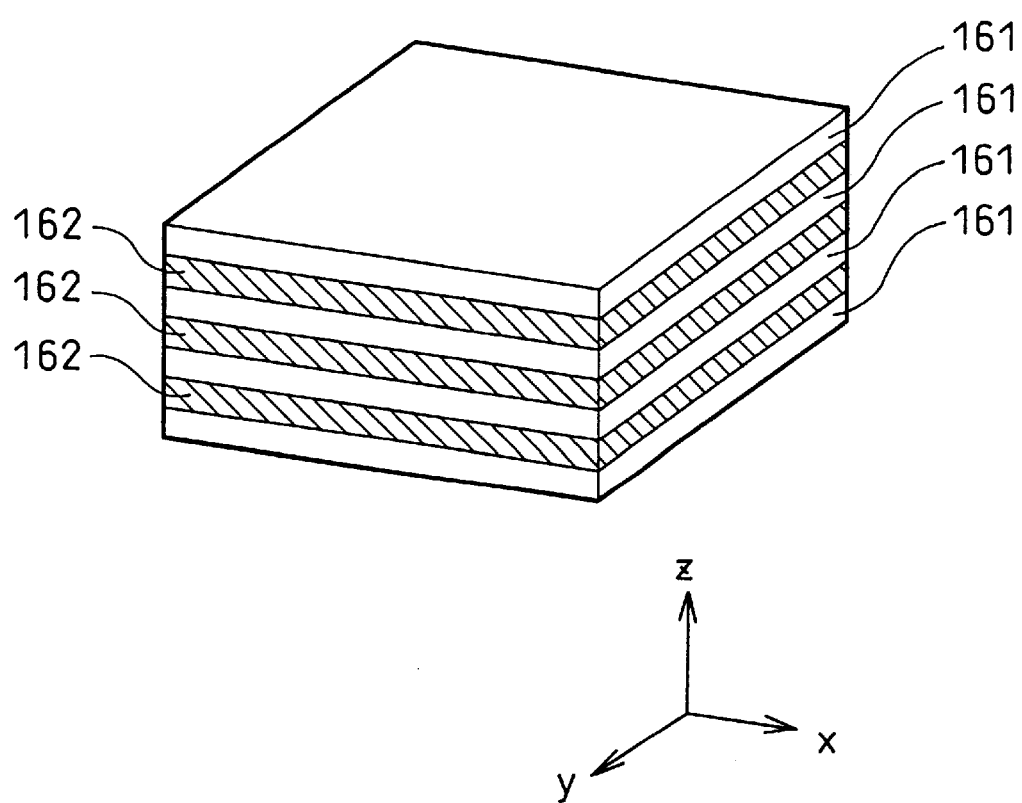
FIG. 2 illustrates the structure of a reflective polarizer 160.

FIG. 2 illustrates the structure of the reflective polarizer 160. The reflective polarizer 160 is basically a birefringent dielectric multi-layered film prepared by alternately placing two different types of polymer layers 161 and 162 one upon another. One of the two different polymers is selected among the materials having a high modulus of photoelasticity, whereas the other polymer is selected among the materials having a low modulus of photoelasticity. It is here noted that the selected materials should have substantially equal ordinary indexes in the orientated state. For example, PEN (2,6-polyethylene naphthalate) is selected for the material having the high modulus of photoelasticity, and coPEN (70-naphthalate/30-terephthalate copolyester) is selected for the material having the low modulus of photoelasticity. Films of these two different polymers were alternately laid one upon another to form a film laminate, and the film laminate was stretched to approximately 5 times in the direction of the x axis in the rectangular coordinate system shown in FIG. 2. The observed index of refraction in the x-axis direction was 1.88 in the PEN layer and 1.64 in the coPEN layer. The observed index of refraction in the y-axis direction was about 1.64 in both the PEN layer and the coPEN layer. When light enters the film laminate from the direction of its normal, a light component vibrating in the y-axis direction is transmitted through the film. This is an axis of transmission. A light component vibrating in the x-axis direction is, on the other hand, reflected only when the PEN layer and the coPEN layer satisfy a predetermined condition. This is an axis of reflection. The predetermined condition is that the sum of an optical path (that is, the product of the index of refraction and the thickness of the film) of the PEN layer and an optical path of the coPEN layer is equal to half the wavelength of light. Lamination of several tens layers or preferably more than 100 layers of both the PEN layer and the coPEN layer to the thickness of about 30 μm enables reflection of substantially all the light component vibrating in the direction of the axis of reflection. Changing the number of layers varies the resulting reflectivity. The reflective polarizer thus manufactured has the polarization ability only for the light of a single design wavelength. In order to attain the polarization ability in a wider range of the wavelength, a plurality of reflective polarizers having different design wavelengths are laid one upon another while their axes of reflection are aligned.

The sufficiently thick laminate of the reflective polarizer is brighter by at least 30% than a known reflection polarizer that is prepared by combining a conventional polarizer (absorptive polarizer) with an aluminum reflector. There are two reasons. One reason is that the reflective polarizer is a dielectric mirror and thereby reflects almost 100% of a specific linearly polarized light component, although the metal aluminum has the reflectivity of not greater than 90%. The other reason is that the conventional absorptive polarizer takes advantage of a dichroic dyestuff, such as a halogen like iodine or a dye and wastes at least 10% of the light because of its relatively low dichromatic ratio.

Another liquid crystal polymer having a cholesteric phase may be combined with a λ/4 phase plate and used for the reflective polarizer. The details of such a reflective polarizer are disclosed, for example, Japanese Patent Laid-Open Gazette No. 8-271892, the disclosure of which is herein incorporated by reference for all purposes.

The reflective polarizer 160 used in the embodiment does not attain a 100% degree of polarization, so that the reflectivity of the linearly polarized light component having the polarizing direction that is parallel to the axis of reflection is several tens percents, while the transmittance of the linearly polarized light component having the polarizing direction that is parallel to the axis of transmission is also several tens percents. The reflective polarizer 160 reflects part of linearly polarized light components having polarizing directions other than that parallel to the axis of reflection and transmits part of linearly polarized light components having polarizing directions other than that parallel to the axis of transmission. The degree of polarization here is defined either by the reflectivity of light in the direction of the axis of reflection or by the transmittance of light in the direction of the axis of transmission.

The diffusing plate 150 (see FIG. 1) has the function of diffusing light. The diffusing plate 150 may be omitted from the liquid crystal device. In this case, the light specularly reflected by the reflection plate 160 is emitted outside as the return light. The diffusing plate 150 has the function of preventing the specular reflection. A plastic film with beads dispersed therein, for example, may be used for the diffusing plate 150. In one possible modification, the diffusing plate may be replaced by the second absorptive polarizer 140 and the reflective polarizer 160 bonded to each other via an optical adhesive with beads dispersed therein. The diffusing plate 150 may be interposed between the first absorptive polarizer 120 and the liquid crystal cell 130, interposed between the liquid crystal cell 130 and the second absorptive polarizer 140, or mounted on the upper surface of the first absorptive polarizer 120.

The backlight 170 includes a light source 171 and a light guide plate 172. Light emitted from the light source 171 is guided and diffused by the light guide plate 172, in order to enable the light to enter all the pixels in the liquid crystal cell 130. The light guide plate 172 may be a diffusing plate or a laminate of light-collecting prisms. The light source 171 may be a cold-cathode tube or a LED (light-emitting diode). An EL (electroluminescence) surface light source may be used for the backlight 170, instead of the combination of the light source 171 with the light guide plate 172.

Figure 3:
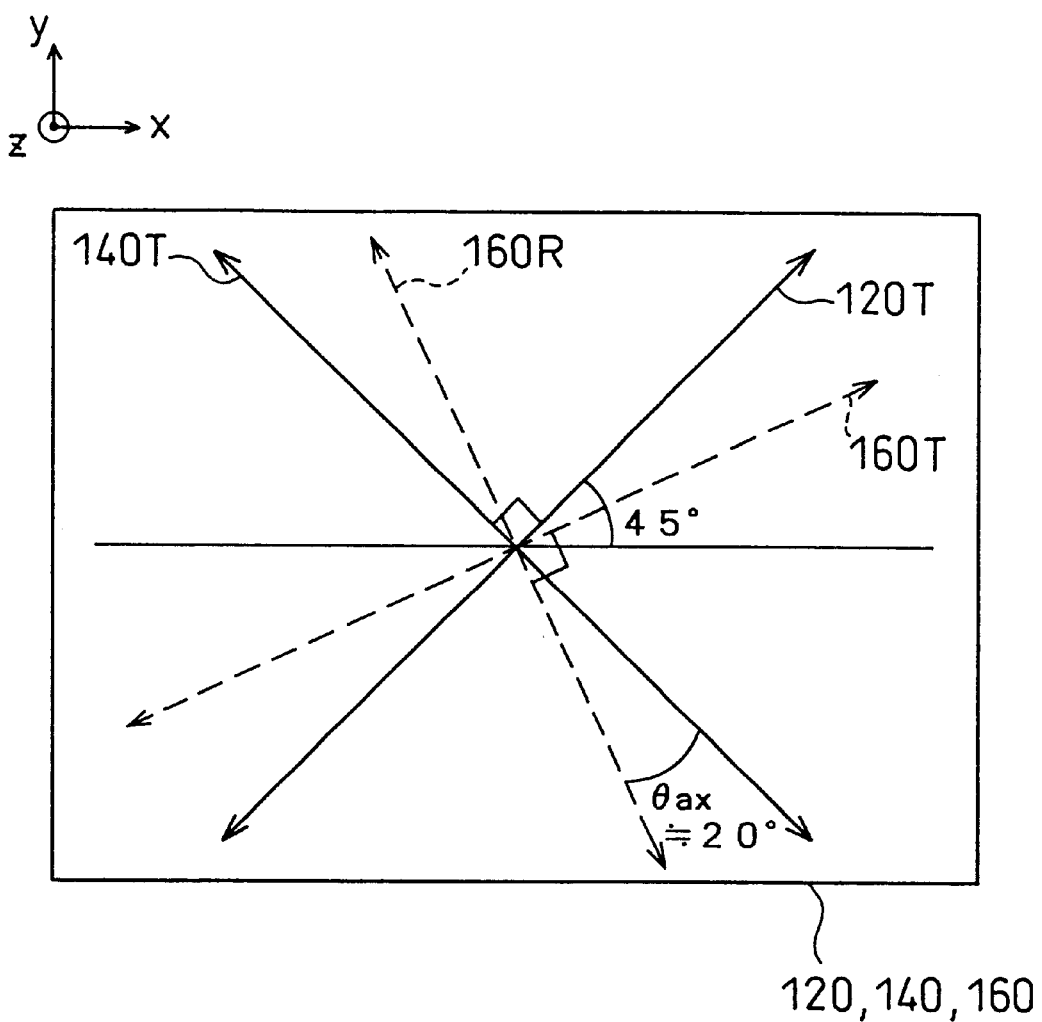
FIG. 3 shows the relationship between an axis of transmission 120T of a first absorptive polarizer 120, an axis of transmission 140T of a second absorptive polarizer 140, and an axis of reflection 160R of the reflective polarizer 160.

FIG. 3 shows the relationship between an axis of transmission 120T of a first absorptive polarizer 120, an axis of transmission 140T of a second absorptive polarizer 140, and an axis of reflection 160R of the reflective polarizer 160. The axis of transmission 120T of the first absorptive polarizer 120 is set to be at right angles to the axis of transmission 140T of the second absorptive polarizer 140. In this example, the axis of transmission 120T of the first absorptive polarizer 120 is set to be inclined 45 degrees counterclockwise against the horizontal direction (the direction of the x axis) in the drawing. The axis of reflection 160R of the reflective polarizer 160 is set to be rotated clockwise by an angle of θax from the axis of transmission 140T of the second absorptive polarizer 140. The reflective polarizer 160 has an axis of transmission 160T that is at right angles to the axis of reflection 160R.

The axis of transmission 120T of the first absorptive polarizer 120 is set in the direction identical with the polarizing direction of linearly polarized light that is to be rotated in the liquid crystal cell 130. In the linearly polarized light transmitted through the first absorptive polarizer 120, a linearly polarized light component passing through the cell area in the OFF state has the polarizing direction rotated by 90 degrees, whereas a linearly polarized light component passing through the cell area in the ON state has the unchanged polarizing direction. The axis of transmission 140T of the second absorptive polarizer 140 is set in the direction perpendicular to the axis of transmission 120T of the first absorptive polarizer 120T, in order to transmit the linearly polarized light component passing through the cell area in the OFF state. The axis of reflection 160R of the reflective polarizer 160 is set to partly reflect the linearly polarized light component transmitted through the cell area in the OFF state and the second absorptive polarizer 140.

Figure 4:
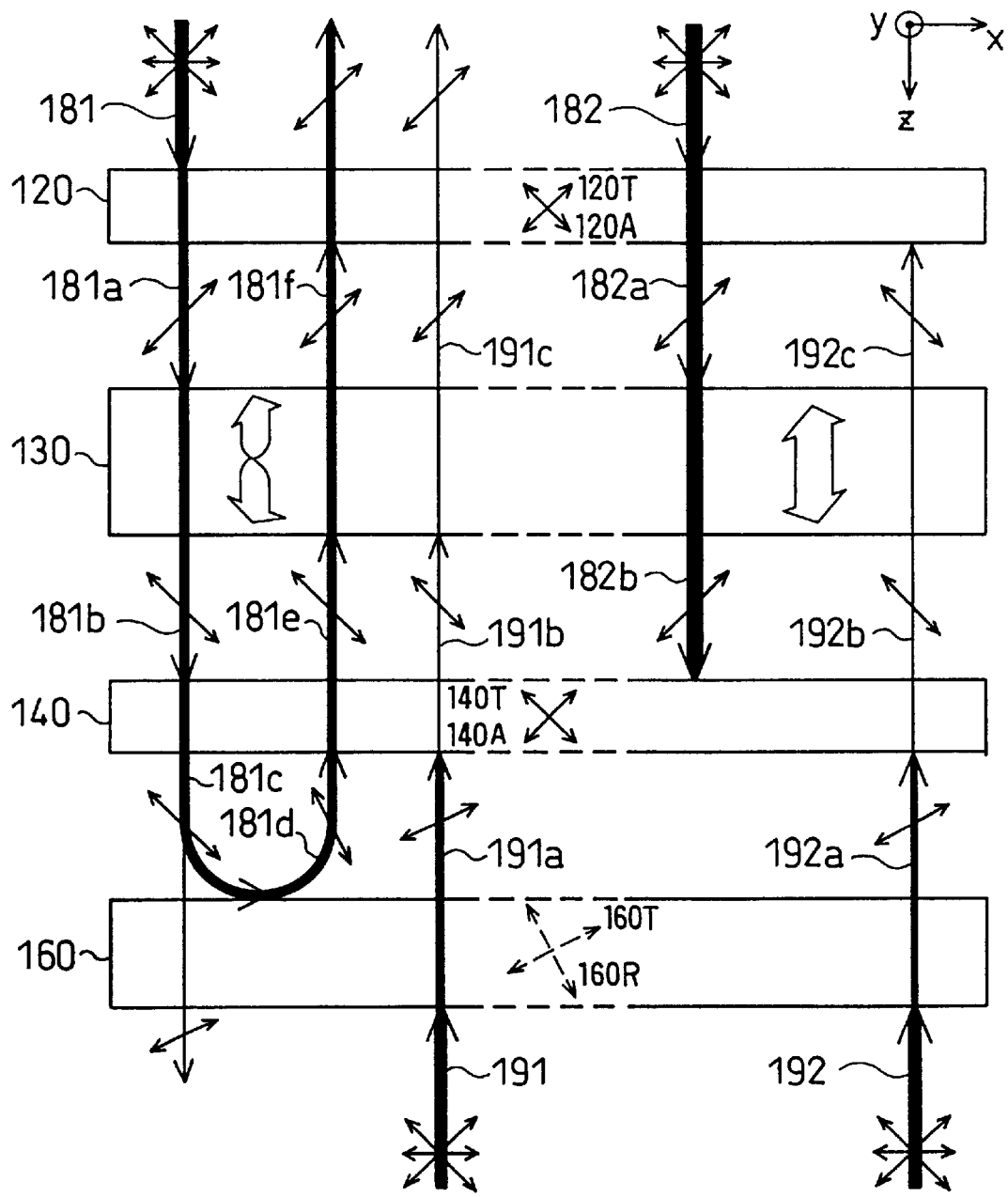
FIGS. 4A and 4B show functions of the liquid crystal device 100 in the first embodiment.

FIGS. 4A and 4B show functions of the liquid crystal device 100 in the first embodiment. FIG. 4A shows bright display (the cell area in the OFF state), and FIG. 4B shows dark display (the cell area in the ON state). The description first regards the case in which the backlight 170 does not emit light, that is, the reflective display mode. The first absorptive polarizer 120 transmits only linearly polarized light components having the polarizing direction that is parallel to the axis of transmission 120T, among non-polarized rays of light 181 and 182 entering the first absorptive polarizer 120, and causes the transmitted, linearly polarized light components to enter the liquid crystal cell 130.

Referring to FIG. 4A, linearly polarized light 181a, which is emitted from the first absorptive polarizer 120 and enters the cell area in the OFF state, is subjected to rotation of the polarizing direction by 90 degrees in the liquid crystal cell 130 and enters the second absorptive polarizer 140 as linearly polarized light 181b. Since the polarizing direction of the linearly polarized light 181b is parallel to the direction of the axis of transmission 140T of the second absorptive polarizer 140, the linearly polarized light 181b is mostly transmitted through the second absorptive polarizer 140 and enters the reflective polarizer 160 as linearly polarized light 181c. The linearly polarized light 181c entering the reflective polarizer 160 can be divided into two polarized light components whose polarization directions are parallel to the axis of reflection 160R and the axis of transmission 160T of the reflective polarizer 160, respectively. The linearly polarized light component having the poraization direction parallel to the axis of reflection 160R is reflected by the reflective polarizer 160 and re-enters the second absorptive polarizer 140 as return light 181d. The return light 181d re-entering the second absorptive polarizer 140 can be divided into two polarized light components whose polarization directions are parallel to the axis of transmission 140T and an axis of absorption 140A of the second absorptive polarizer 140, respectively. The polarized light component having the porarization direction parallel to the axis of absorption 140A is mostly absorbed, while only the polarized light component having the porarization direction parallel to the axis of transmission 140T re-enters the liquid crystal cell 130 as linearly polarized light 181e. The linearly polarized light 181e re-entering the liquid crystal cell 130 is subjected to rotation of the polarizing direction by 90 degrees in the liquid crystal cell 130 and enters the first absorptive polarizer 120 as linearly polarized light 181f. Since the polarizing direction of the linearly polarized light 181f is parallel to the axis of transmission 120T of the first absorptive polarizer 120, the linearly polarized light 181f is mostly transmitted through the first absorptive polarizer 120 and emitted. The cell area in the OFF state is accordingly displayed as a bright pixel in the reflective display mode.

Referring to FIG. 4B, on the other hand, linearly polarized light 182a, which is transmitted through the first absorptive polarizer 120 and enters the liquid crystal cell 130 in the ON state, is transmitted through the liquid crystal cell 130 without rotation of the polarizing direction and enters the second absorptive polarizer 140 as linearly polarized light 182b. The linearly polarized light 182b entering the second absorptive polarizer 140 has the polarizing direction that is parallel to the axis of absorption 140A of the second absorptive polarizer 140 (that is, the direction perpendicular to the axis of transmission 140T). The linearly polarized light 182b is thus mostly absorbed by the second absorptive polarizer 140 and is not transmitted through the first absorptive polarizer 120. The cell area in the ON state is accordingly displayed as a dark pixel in the reflective display mode.

The liquid crystal cell 130 can be set in an intermediate state between the ON state and the OFF state. When the liquid crystal cell 130 is in the intermediate state, the state of FIG. 4A and the state of FIG. 4B are mixed with each other to attain the display of intermediate tone.

The following description regards the case in which the backlight 170 (see FIG. 1) emits light, that is, the transmissive display mode. The reflective polarizer 160 transmits polarized light components having the polarizing direction that is parallel to the axis of transmission 160T of the reflective polarizer 160, among non-polarized rays 191 and 192 emitted from the backlight 170, and causes the transmitted, polarized light components to enter the second absorptive polarizer 140 as polarized light components 191a and 192a. The reflective polarizer 160, however, has a low degree of polarization and thereby causes polarized light components having polarizing directions other than that parallel to the axis of transmission 160T to be partially transmitted. The polarized light entering the second absorptive polarizer 140 can be divided into two polarized light components having the porarization directions parallel to the axis of transmission 140T and the axis of absorption 140A of the second absorptive polarizer 140, respectively. Only the polarized light component having the porarization direction parallel to the axis of transmission 140T enters the liquid crystal cell 130.

Referring to FIG. 4A, linearly polarized light 191b, which is emitted from the second absorptive polarizer 140 and enters the cell area in the OFF state, is subjected to rotation of the polarizing direction by 90 degrees in the liquid crystal cell 130 and enters the first absorptive polarizer 120 as linearly polarized light 191c. Since the polarizing direction of the linearly polarized light 191c is parallel to the axis of transmission 120T of the first absorptive polarizer 120, the linearly polarized light 191c is mostly transmitted through the first absorptive polarizer 120 and emitted. The cell area in the OFF state is accordingly displayed as a bright pixel in the transmissive display mode, in the same manner as in the reflective display mode.

Referring to FIG. 4B, on the other hand, linearly polarized light 192b, which is transmitted through the second absorptive polarizer 140 and enters the cell area in the ON state, is transmitted through the liquid crystal polarizer 130 without rotation of the polarizing direction and enters the first absorptive polarizer 120 as linearly polarized light 192c. Since the polarizing direction of the linearly polarized light 192c is parallel to the axis of absorption 120A of the first absorptive polarizer 120, the linearly polarized light 192c is mostly absorbed by the first absorptive polarizer 120 and is not transmitted through the first absorptive polarizer 120. The cell area in the ON state is accordingly displayed as a dark pixel in the transmissive display mode, in the same manner as in the reflective display mode. As discussed above, the transflective liquid crystal device 100 of the first embodiment has the same bright/dark states in both of the reflective display mode and the transmissive display mode.

Figure 5:
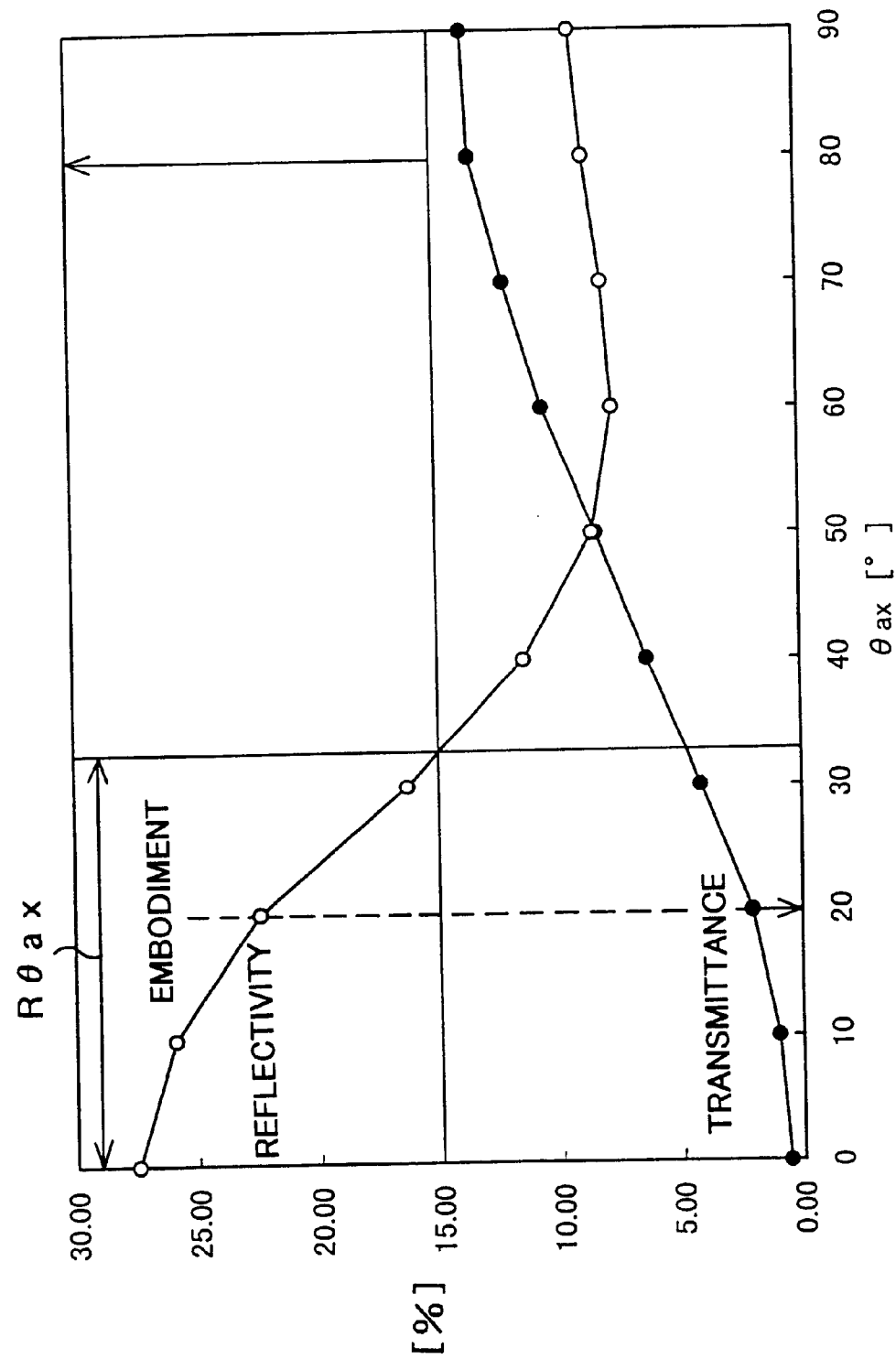
FIG. 5 is a graph showing a variation in reflectivity in a reflective display mode and a variation in transmittance in a transmissive display mode in the liquid crystal device 100 of the first embodiment.

FIG. 5 is a graph showing a variation in reflectivity in the reflective display mode and a variation in transmittance in the transmissive display mode in the liquid crystal device 100 of the first embodiment. The data in the graph of FIG. 5 are plotted, with angle (hereinafter referred to as the combination angle) θax between the axis of transmission 140T of the second absorptive polarizer 140 and the axis of reflection 160R of the reflective polarizer 160 as abscissa and reflectivity, and transmittance as ordinate, under the condition that all the pixels in the liquid crystal cell 130 are in the OFF state, that is, displayed in white. The transmittance and reflectivity in the graph of FIG. 5 are results of the measurement using NPF-EG1228DU (manufactured by NITTO DENKO Co., Ltd.) as the first absorptive polarizer 120 and the second absorptive polarizer 140 and RDF-C (manufactured by 3M Corp.) as the reflective polarizer 160. The RDF-C has the functions of both the diffusing plate 150 and the reflective polarizer 160 shown in FIG. 1. The standard light source C is used for the measurement of the transmittance and the reflectivity. The reflectivity here is defined as the ratio of the intensity of reflected light under the condition of the display in the brightest reflective display mode (that is, the reflective display) in the liquid crystal device 100 placed at a predetermined position from the standard light source C to the intensity of reflected light from a standard white plate placed at the same position.

In this liquid crystal device 100, the combination angle θax is set equal to about 20 degrees as shown in FIG. 3. The graph of FIG. 5 gives the reflectivity of about 22.4% and the transmittance of about 2.1% for this combination angle θax. In the conventional liquid crystal display described as the prior art, the reflectivity can be enhanced to about 29%. Although the liquid crystal device 100 of the first embodiment has a little lower reflectivity but attains substantially equivalent brightness. The liquid crystal device 100 further has the significant advantage, that is, no reversion of the bright/dark states between the reflective display mode and the transmissive display mode.

A transflector (for example, an Al/Ag deposit film) may be used, in place of the reflective polarizer, to prevent reversion of the bright/dark states between the reflective display mode and the transmissive display mode. In this case, however, the reflectivity is about 15% at most. Compared with this liquid crystal device including the transflector, the liquid crystal device 100 of the embodiment attains the sufficiently bright reflective display.

As described above, the liquid crystal device 100 of the first embodiment ensures the display without reversion of the bright/dark states between the reflective display mode and the transmissive display mode, while maintaining the advantageous characteristics (that is, the reflectivity) of the reflective display.

It is desirable that the reflectivity of the liquid crystal device 100 is not less than about 15%. For that purpose, the combination angle θax should be set in the range of about 0 degree to 35 degrees: the range Rθax shown in FIG. 5. When the combination angle θax is equal to 0 degree, the reflectivity is about 27.5%, which attains the extremely bright reflective display. The combination angle θax sufficiently close to 0 degree may, however, cause uneven polarization of the reflective polarizer 160 to be observed in the transmissive display. The combination angle θax is thus preferably in the range of about 0 degree to 30 degrees and more preferably in the range of about 15 degrees to 25 degrees. The uneven polarization of the reflective polarizer 160 can be relieved by placing a polarizer having an axis of transmission that is parallel to the axis of transmission 160T of the reflective polarizer 160 between the reflective polarizer 160 and the backlight 170.

The above description regards the example, in which the axis of transmission 120T of the first absorptive polarizer 120 is set in the direction inclined 45 degrees counterclockwise against the x axis, and the axis of transmission 140T of the second absorptive polarizer 140 is set to be at right angles to the axis of transmission 120T as shown in FIG. 3. The axis of transmission 140T may be set parallel to the axis of transmission 120T. In this case, the liquid crystal cell 130 is displayed as a bright pixel in the ON state and as a dark pixel in the OFF state. The axis of transmission 120T is not restricted to the direction inclined counterclockwise 45 degrees counterclockwise against the x axis, but is set arbitrarily depending upon the structure of the liquid crystal cell 130.

The above description regards the specific arrangement in which the reflective polarizer 160 has the axis of reflection 160R and the axis of transmission 160T that are arranged perpendicularly to each other. This arrangement is, however, not essential, and the axis of reflection 160R and the axis of transmission 160T may be not perpendicular to each other.

The above description refers to the specific arrangement of the liquid crystal cell in which the polarizing direction of the light passing through the cell area in the OFF state is rotated by 90 degrees, while the polarizing direction of the light passing through the cell area in the ON state is not rotated. This arrangement is, however, not essential. Another available liquid crystal cell changes the polarizing conditions of light in the ON state and in the OFF state, like an STN-type liquid crystal cell that takes advantage of the birefringence. Any liquid crystal cell can be used as long as the polarizing direction of light passing through the cell area in the ON state is substantially perpendicular to the polarizing direction of light passing through the cell area in the OFF state.

B. Second Embodiment

Figure 6:
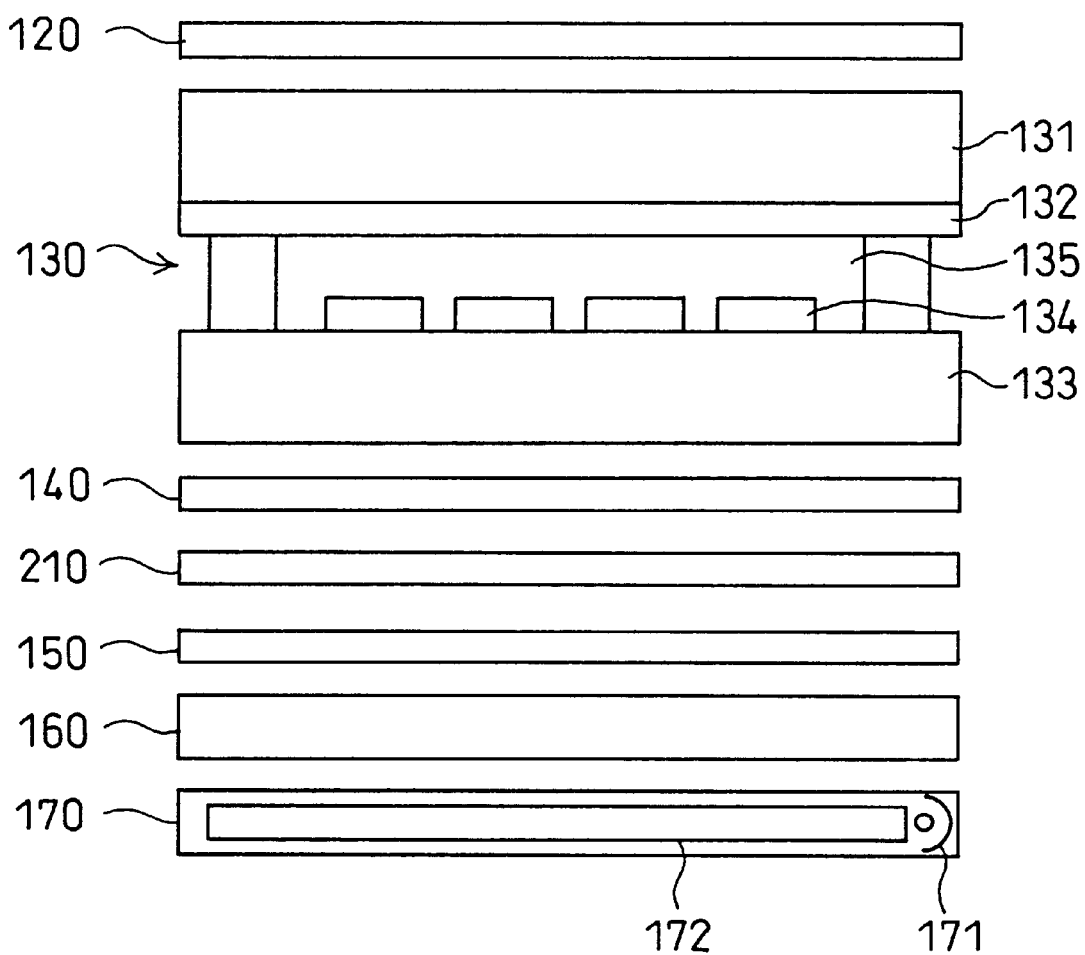
FIG. 6 schematically illustrates the structure of another liquid crystal device 200 in a second embodiment according to the present invention.

FIG. 6 schematically illustrates the structure of another liquid crystal device 200 in a second embodiment according to the present invention. The liquid crystal device 200 has a similar structure to that of the liquid crystal device 100 of the first embodiment, except that a λ/2 phase plate 210 is interposed between the second absorptive polarizer 140 and the diffusing plate 150 in the liquid crystal device 100 of the first embodiment.

Figure 7:
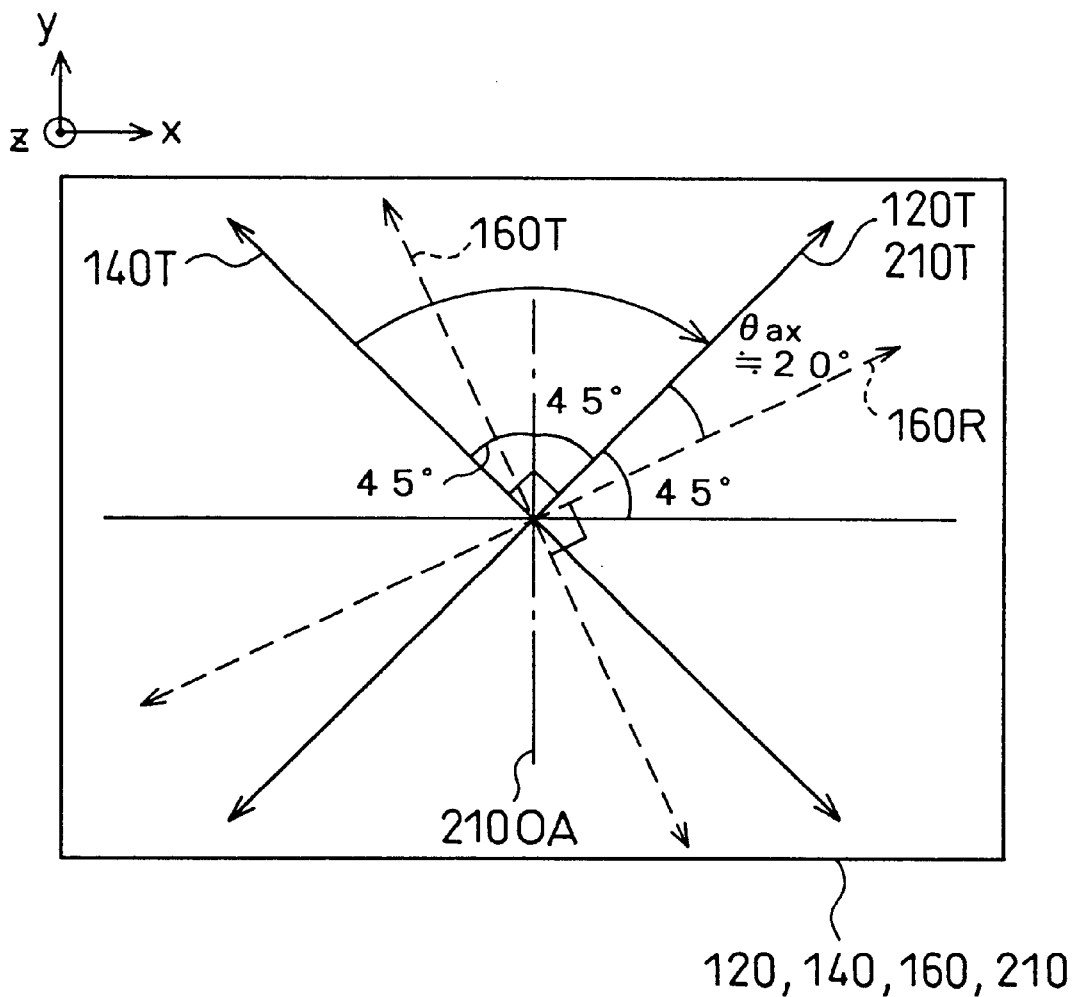
FIG. 7 shows the relationship between the axis of transmission 120T of the first absorptive polarizer 120, the axis of transmission 140T of the second absorptive polarizer 140, an optical axis 210OA of a λ/2 phase plate 210, and the axis of reflection 160R of the reflective polarizer 160.

FIG. 7 shows the relationship between the axis of transmission 120T of the first absorptive polarizer 120, the axis of transmission 140T of the second absorptive polarizer 140, an optical axis 210OA of the λ/2 phase plate 210, and the axis of reflection 160R of the reflective polarizer 160. In the liquid crystal device 200 of the second embodiment, the axis of transmission 120T of the first absorptive polarizer 120 is set to be inclined 45 degrees counterclockwise against the x axis. The axis of transmission 140T of the second absorptive polarizer 140 is set to be at right angles to the axis of transmission 120T of the first absorptive polarizer 120. The optical axis 210OA of the λ/2 phase plate 210 is set to be inclined 45 degrees clockwise against the axis of transmission 140T. Linearly polarized light, having the polarizing direction parallel to the axis of transmission 140T, entering the λ/2 phase plate 210 is accordingly converted into linearly polarized light rotated 90 degrees clockwise, that is, linearly polarized light having an axis of polarization 210T that is parallel to the axis of transmission 120T of the first absorptive polarizer 120. The axis of reflection 160R of the reflective polarizer 160 is set to be inclined about 20 degrees clockwise against the axis of polarization 210T.

Setting the axis of transmission 120T of the first absorptive polarizer 120, the axis of transmission 140T of the second absorptive polarizer 140, the optical axis 210OA of the λ/2 phase plate 210, and the axis of reflection 160R of the reflective polarizer 160 as shown in FIG. 7 enables the liquid crystal device 200 to ensure the display without reversion of the bright/dark states between the reflective display mode and the transmissive display mode, while maintaining the advantageous characteristics of the reflective display, like the liquid crystal device 100 of the first embodiment.

The above description refers to the specific arrangement in which the λ/2 phase plate 210 is interposed between the second absorptive polarizer 140 and the diffusing plate 150. The λ/2 phase plate 210 may, however, alternatively be interposed between the diffusing plate 150 and the reflective polarizer 160. This arrangement exerts almost the same effects. A λ/4 phase plate may be used in place of the λ/2 phase plate.

C. Third Embodiment

Figure 8:
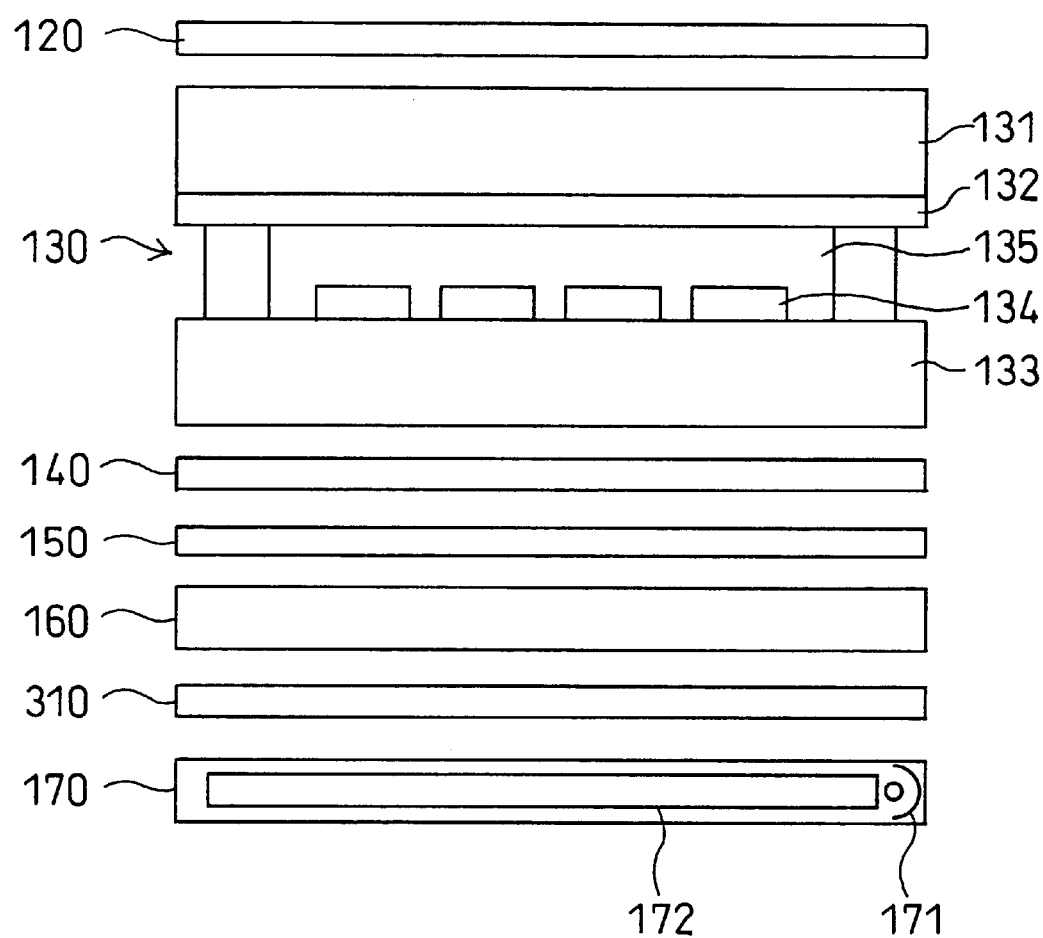
FIG. 8 schematically illustrates the structure of still another liquid crystal device 300 in a third embodiment according to the present invention.

FIG. 8 schematically illustrates the structure of still another liquid crystal device 300 in a third embodiment according to the present invention. The liquid crystal device 300 has a similar structure to that of the liquid crystal device 100 of the first embodiment, except that a color filter plate 310 is interposed between the reflective polarizer 160 and the backlight 170 in the liquid crystal device 100 of the first embodiment. The modification from the first embodiment is instead to attain the following effect.

Figure 9:
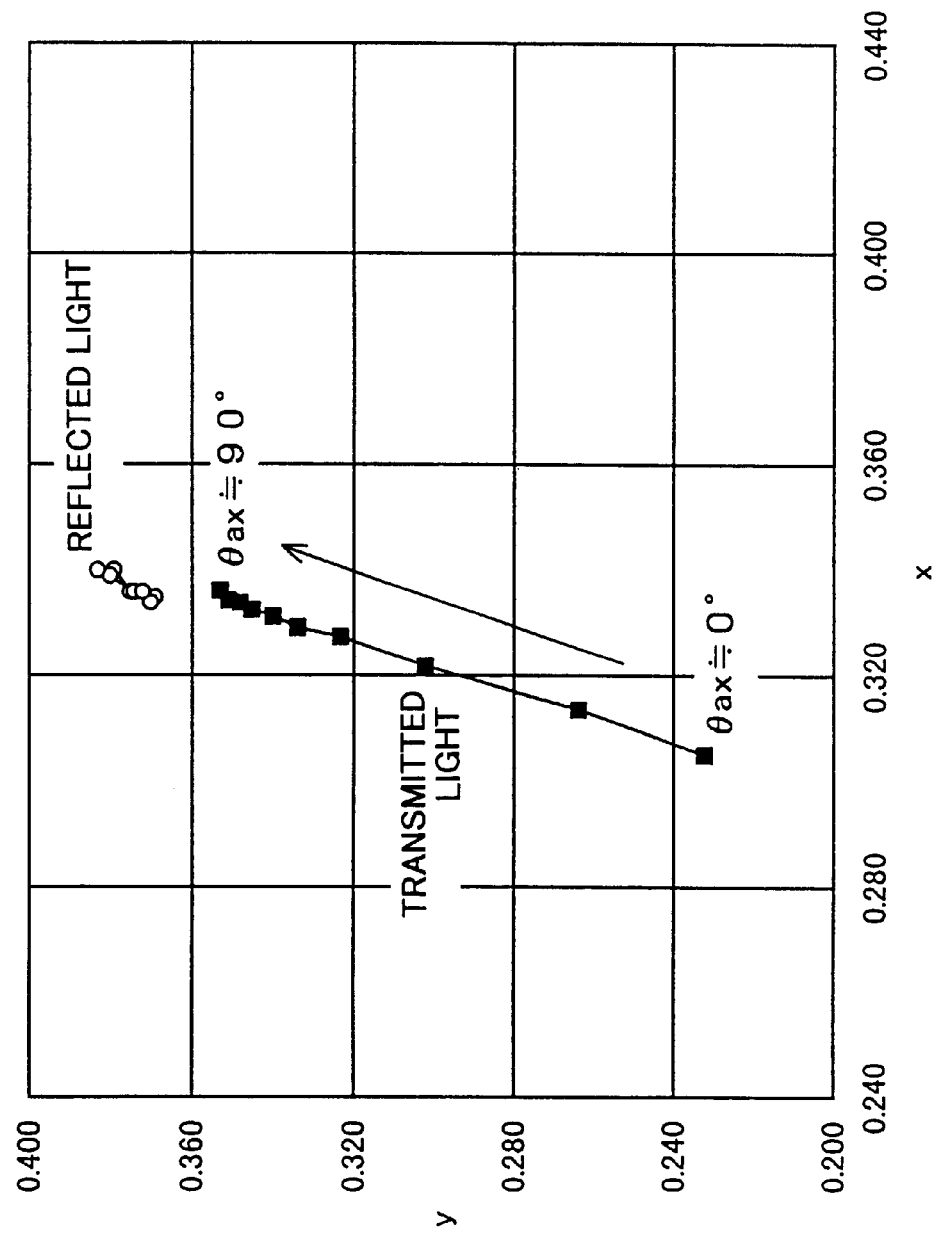
FIG. 9 is a graph showing xy chromaticity coordinates of the reflected light and transmitted light that are observed in the first embodiment shown in the graph of FIG. 5, in an XYZ color specification system.

FIG. 9 is a graph showing xy chromaticity coordinates of the reflected light and transmitted light that are observed in the first embodiment shown in the graph of FIG. 5, in an XYZ color specification system. The graph of FIG. 9 shows variations in chromaticity coordinates of the transmitted light and the reflected light against the combination angle θax in the case of bright display. As clearly understood from the graph, while the color of the reflected light hardly changes, the color of the transmitted light is different from the color of the reflected light and significantly varies with the combination angle θax. In the liquid crystal device 300 of the third embodiment, the color filter plate 310 is placed between the backlight 170 and the reflective polarizer 160, in order to make the color of the transmitted light close to the color of the reflected light. This arrangement effectively reduces a difference in color tone of the display between the reflective display and the transmissive display.

Although the liquid crystal device 300 includes the color filter plate 310, the emission spectra of the light source 171 included in the backlight 170 may be adjusted to reduce the color tone difference while omitting the color filter plate.

D. Examples of Electronic Apparatus

Figure 10A:
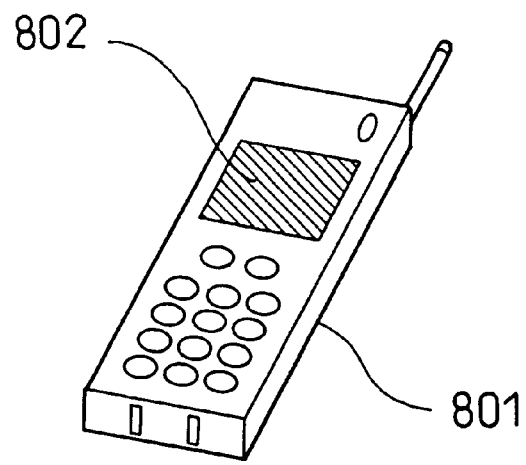
FIGS. 10A through 10C show examples of electronic apparatus to which the liquid crystal device of the present invention is applied.
Figure 10B:
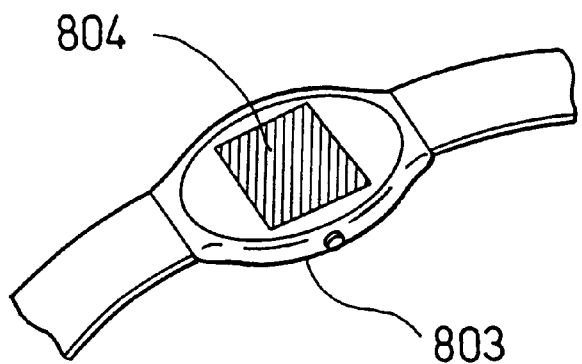
Figure 10C:
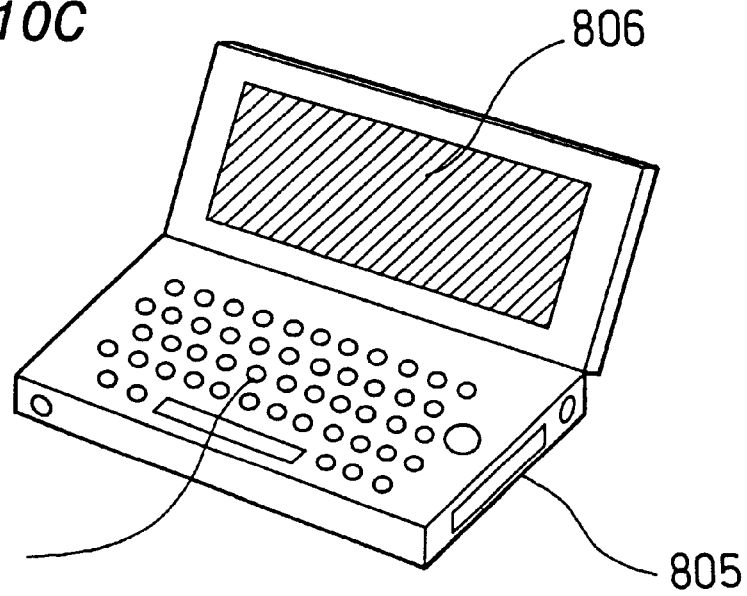
Figure 11:
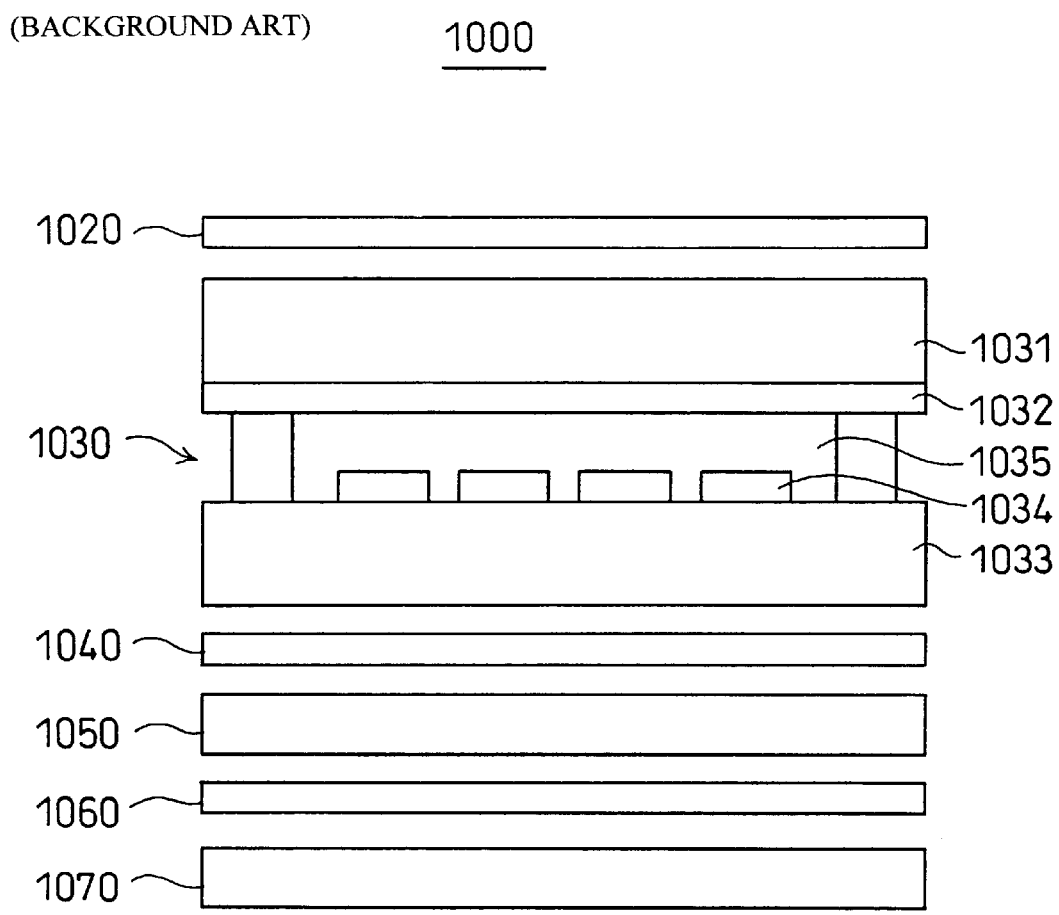
FIG. 11 schematically illustrates the structure of a conventional transflective liquid crystal device.
Figure 12:
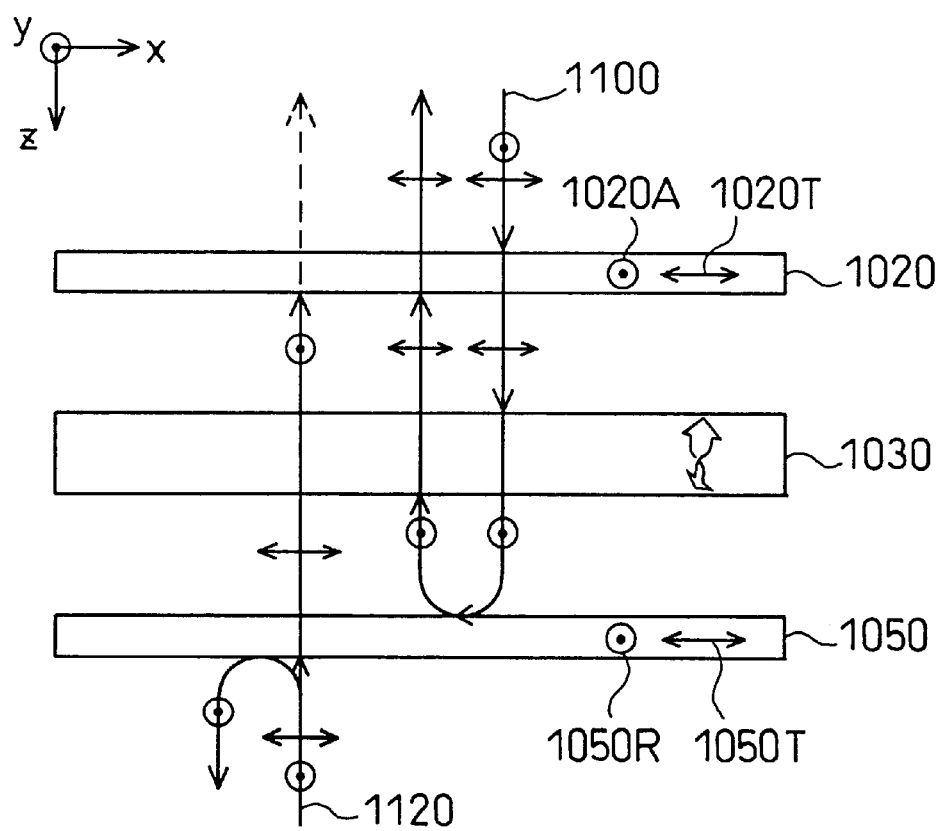
FIG. 12 shows problems arising in the conventional transflective liquid crystal device.

The liquid crystal device of the present invention is favorably applicable for a display device included in a variety of portable equipment that are used in various environments and desired to have a little power consumption. FIGS. 10A through 10C show examples of electronic apparatus to which the liquid crystal device of the present invention is applied.

FIG. 10A shows a cellular phone having a display unit 802 in an upper section on a front face of a main body 801. FIG. 10B shows a watch having a display unit 804 on the center of a main body 803. FIG. 10C shows a portable information apparatus having a display unit 806 in an upper section of a main body 805 and an input unit 807 in a lower section thereof.

These information equipment are used in a variety of environments, indoors and outdoors, and are thus desirable to be driven with batteries over a long time period. It is accordingly preferable that the display device used for these display units 802, 804, and 806 has a little power consumption. One known example of the display device having a little power consumption is a reflection liquid crystal device taking advantage of natural light. The known reflection liquid crystal device, however, can not be used practically in dark surroundings. The liquid crystal device of the present invention can be used in two different modes, that is, the reflective display mode and the transmissive display mode. The liquid crystal device of the present invention ensures the display without reversion of the bright/dark states between the reflective display mode and the transmissive display mode, while maintaining the brightness in the reflective display. The liquid crystal device of the present invention is thus effectively applied for the electronic apparatuses.

The above embodiments regard the liquid crystal cells of the simple matrix configuration. The present invention is, however, also applicable to liquid crystal cells of an active matrix configuration. Although not specifically mentioned in the above embodiments, the present invention is applicable to liquid crystal cells for both color display and monochromatic display.

The examples of the electronic apparatus discussed above are not restrictive but only illustrative. The liquid crystal device of the present invention is applicable to a variety of other electronic apparatuses having a display unit.

It should be clearly understood that the above embodiments are only illustrative and not restrictive in any sense. The scope and spirit of the present invention are limited only by the terms of the appended claims.

What is claimed is:

1. A liquid crystal device that modulates light responsive to given image signals, comprising:
   a first absorptive polarizer configured to receive light from outside;
   a liquid crystal cell configured to receive light emitted from the first absorptive polarizer;
   a second absorptive polarizer configured to receive light emitted from the liquid crystal cell; and
   a reflective polarizer configured to receive light emitted from the second absorptive polarizer,
   wherein the reflective polarizer has an axis of reflection in a predetermined direction to reflect at least part of light transmitted through the first absorptive polarizer, the liquid crystal cell, and the second absorptive polarizer to be incident on the reflective polarizer, and the reflective polarizer partially transmits light including a linearly polarized light component which is included in light entering the reflective polarizer from an opposite side to a side facing the second absorptive polarizer to be transmitted through the second absorptive polarizer, and
   wherein the first absorptive polarizer has an axis of transmission in a specific direction to cause light reflected by the reflective polarizer and transmitted through the second absorptive polarizer to be transmitted through the first absorptive polarizer,
   said liquid crystal device further comprising:
      a backlight disposed on the opposite side of the reflective polarizer,
      wherein light emitted from the backlight is adjusted to have a color other than white in order to cause color of a first light to be close to color of a second light, the first light being one that is emitted from the backlight and transmitted through the reflective polarizer, the second absorptive polarizer, the liquid crystal cell, and the first absorptive polarizer, the second light being the one from the outside transmitted through the first absorptive polarizer, the liquid crystal cell, and the second absorptive polarizer, subsequently reflected by the reflective polarizer, then transmitted through the second absorptive polarizer, the liquid crystal cell, and the first absorptive polarizer.

2. A liquid crystal device in accordance with claim 1, wherein the backlight comprises:
   a light source; and
   a color filter that adjusts color of light emitted from the light source.

3. An electronic apparatus comprising:
   a display device, the display device including,
      a first absorptive polarizer configured to receive light from outside,
      a liquid crystal cell configured to receive light emitted from the first absorptive polarizer,
      a second absorptive polarizer configured to receive light emitted from the liquid crystal cell, and
      a reflective polarizer configured to receive light emitted from the second absorptive polarizer,
      wherein the reflective polarizer has an axis of reflection in a predetermined direction to reflect at least part of light transmitted through the first absorptive polarizer, the liquid crystal cell, and the second absorptive polarizer to be incident on the reflective polarizer, and the reflective polarizer partially transmits light including a linearly polarized light component which is included in light entering the reflective polarizer from an opposite side to a side facing the second absorptive polarizer to be transmitted through the second absorptive polarizer, and
      wherein the first absorptive polarizer has an axis of transmission in a specific direction to cause light reflected by the reflective polarizer and transmitted through the second absorptive polarizer to be transmitted through the first absorptive polarizer, the display device further comprising, a backlight disposed on the opposite side of the reflective polarizer, wherein light emitted from the backlight is adjusted to have a color other than white in order to cause color of a first light to be close to color of the second light, the first light being one that is emitted from the backlight and transmitted through the reflective polarizer, the second absorptive polarizer, the liquid crystal cell, and the first absorptive polarizer, the second light being the one from the outside transmitted through the first absorptive polarizer, the liquid crystal cell, and the second absorptive polarizer, subsequently reflected by the reflective polarizer, then transmitted through the second absorptive polarizer the liquid crystal cell, and the first absorptive polarizer.

4. An electronic apparatus in accordance with claim 3, wherein the backlight comprises:

a light source; and a color filter that adjusts color of light emitted from the light source.

* * * * *